United States Patent
Koenck et al.

(10) Patent No.: US 7,069,120 B1
(45) Date of Patent: Jun. 27, 2006

(54) POSITION SENSING SYSTEM

(75) Inventors: Steven E. Koenck, Cedar Rapids, IA (US); Guolin Peng, Cedar Rapids, IA (US); David W. Jensen, Cedar Rapids, IA (US); Gregory A. Arundale, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 281 days.

(21) Appl. No.: 10/691,354

(22) Filed: Oct. 22, 2003

(51) Int. Cl.
*G05D 1/00* (2006.01)

(52) U.S. Cl. .......................... 701/3; 701/1; 250/227.12

(58) Field of Classification Search .................... 701/1, 701/2, 3, 4, 5, 6, 8, 9, 14, 15, 16; 250/227.11, 250/227.12, 227.21, 227.23, 227.18; 356/477, 356/478
See application file for complete search history.

(56) References Cited

U.S. PATENT DOCUMENTS

| | | | |
|---|---|---|---|
| 4,465,373 A * | 8/1984 | Tamaki et al. ............. 356/617 |
| 4,740,688 A * | 4/1988 | Edwards ...................... 250/226 |
| 4,967,071 A * | 10/1990 | Park et al. ............. 250/227.21 |
| 5,237,391 A * | 8/1993 | Huggins ..................... 356/617 |
| 5,726,786 A * | 3/1998 | Heflinger .................... 398/128 |

* cited by examiner

*Primary Examiner*—Richard M. Camby
(74) *Attorney, Agent, or Firm*—Nathan O. Jensen; Kyle Eppele

(57) ABSTRACT

A passive sensing system for determining a physical position of a mechanical device includes an encoding system configured to convert a position signal representative of the physical position of the mechanical device into an encoded signal in a binary format. The sensing system also comprises a plurality of secondary optical paths coupled to a primary optical path positioned between a light source and the encoding system. The encoded signal comprises a plurality of pulses of light each sequentially delayed by the secondary optical paths. A system for determining a physical position of a flight control surface of an aircraft is also disclosed. A method for determining a physical position of a flight control surface of an aircraft is also disclosed. A passive sensing system for determining a physical position of a flight control surface of an aircraft is also disclosed.

37 Claims, 11 Drawing Sheets

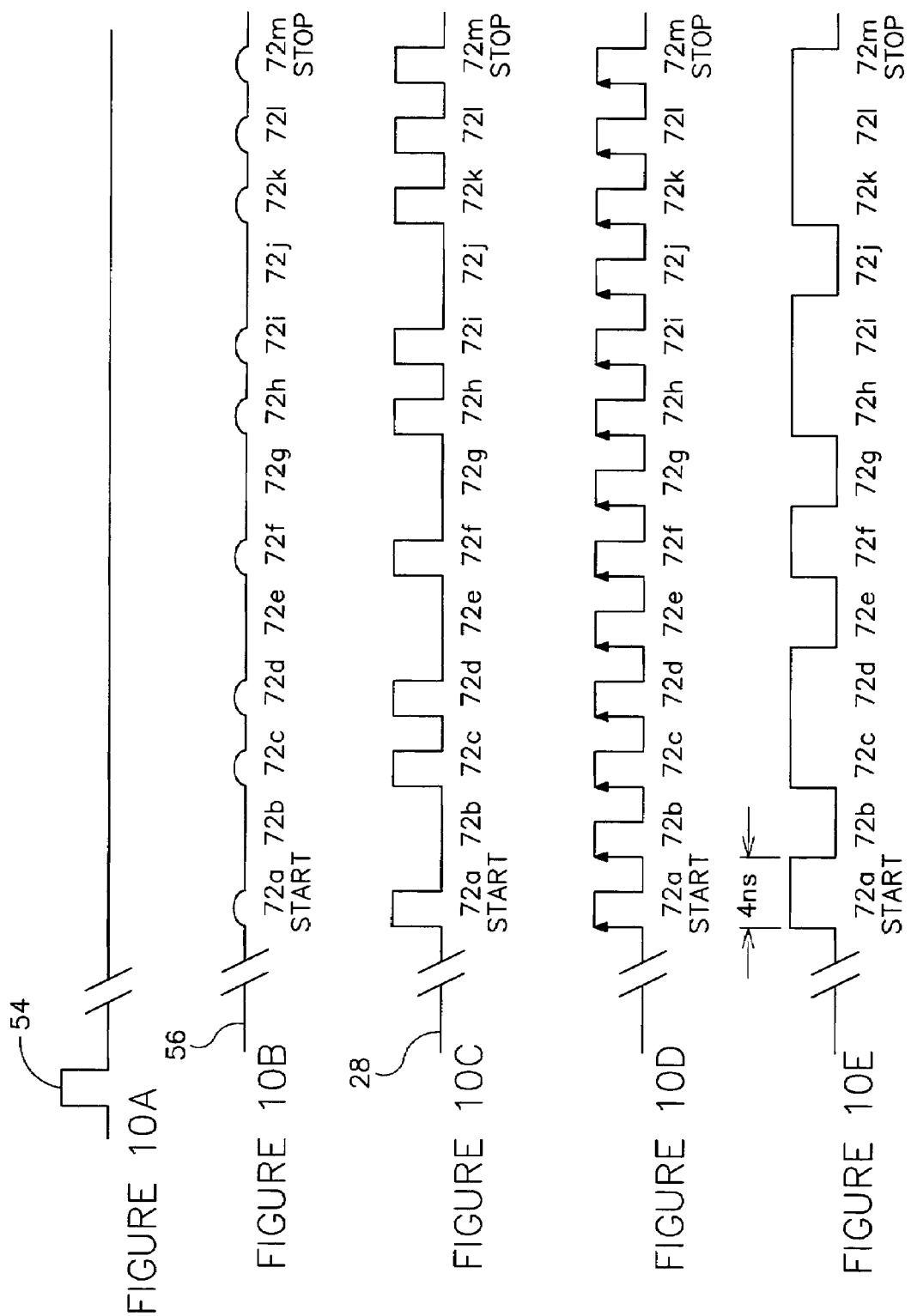

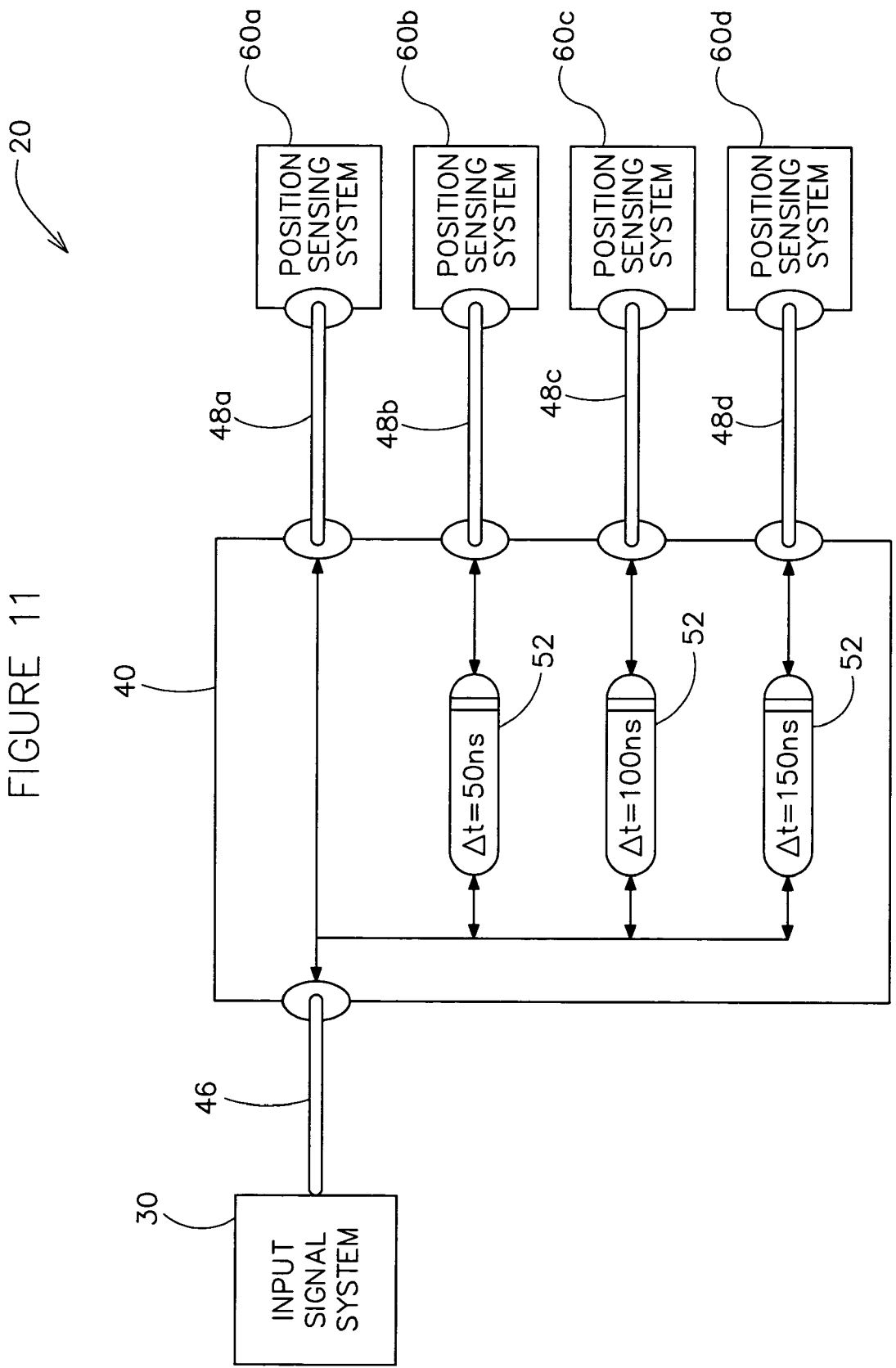

POSITION SENSING SYSTEM

FIELD OF THE INVENTION

The present invention relates to a position sensing system. More particularly, the present invention relates to a passive optical position sensor. More particularly, the present invention relates to an optical sensor for determining the position of a mechanical device. More particularly, the present invention relates to a fiber optic position sensor for determining the physical position of a flight control surface of an aircraft.

BACKGROUND OF THE INVENTION

It is generally known to provide a position sensor, such as for an aircraft. Such conventional position sensors provide signals representative of the physical position of a "flight control surface" of the aircraft. An exemplary flight control surface includes an aileron used to control rolling and banking movements of the aircraft. Such conventional position sensors are typically located outside the main body or pressure envelope of the aircraft. Hence, such conventional position sensors (e.g. located on the wings of the aircraft) are subject to extreme environmental stress including electrical phenomena such as lightning and high intensity radiated fields ("HIRF"), as well as temperature, vibration, moisture, dirt, etc. Such conventional position sensors have several disadvantages including that they are intrinsically analog (i.e. include an electrical circuit having an output that is proportional to the input) and are adversely affected by electrical noise interference.

Accordingly, there is a need for a position sensor that is mechanically and electrically robust. There is also a need for a position sensor that is relatively precise. There is also a need for a position sensor that is electrically passive and resists signal degradation. There is also a need for a position sensor that provides in digital form a signal representative of a physical position of a flight control surface of the aircraft. Yet further, there is a need for a position sensing system having one or more of these or other advantageous features.

SUMMARY OF THE INVENTION

One embodiment of the invention relates to a passive sensing system for determining a physical position of a mechanical device. The sensing system comprises an encoding system configured to convert a position signal representative of the physical position of the mechanical device into an encoded signal in a binary format. The sensing system also comprises a plurality of secondary optical paths coupled to a primary optical path, each positioned between a light source and the encoding system. The encoded signal comprises a plurality of pulses of light each sequentially delayed by the secondary optical paths.

Yet another exemplary embodiment of the invention relates to a system for determining a physical position of a flight control surface of an aircraft. The system comprises means for transmitting an incident pulse of light. The system also comprises means for dividing the incident pulse of light into a plurality of incident pulses of light. The system also comprises means for reflecting the incident pulses of light and for providing a plurality of reflected pulses of light. The system also comprises means for delaying the incident pulses of light and for delaying the reflected pulses of light. The system also comprises means for detecting the reflected pulses of light. A signal encoded in a binary format and representative of the physical position of the flight control surface is provided to the means for detecting the reflected pulses of light.

Still another exemplary embodiment of the invention relates to a method for determining a physical position of a flight control surface of an aircraft. The method comprises transmitting an incident pulse of light from a light source through a primary optical path and subsequently dividing the incident pulse of light into a plurality of incident pulses of light. The method also comprises transmitting the incident pulses of light through a plurality of secondary optical paths. The method also comprises reflecting the incident pulses of light with a reflector. The method also comprises transmitting the reflected pulses of light through the plurality of optical paths and subsequently transmitting the reflected pulses of light through the secondary path. The method also comprises detecting the reflected pulses of light with a control system having a photodetector. An encoded signal representative of the physical position of the flight control surface is read by the control system.

Another exemplary embodiment of the invention relates to a passive sensing system for determining a physical position of a flight control surface of an aircraft. The sensing system comprises an encoding system configured to provide a signal encoded in a binary format and representative of the physical position of the flight control surface. The sensing system also comprises a single fiber optic cable having a first diameter and coupled between a light source and the encoding system. The sensing system also comprises a plurality of fiber optic cables each having a second diameter less than the first diameter and configured for coupling to an end of the single fiber optic cable. An illumination pulse from the light source is divided into a plurality of pulses by the plurality of fiber optic cables.

BRIEF DESCRIPTION OF THE DRAWINGS

Exemplary embodiments will hereafter be described with reference to the accompanying drawings, wherein like numerals denote like elements, and:

FIGS. 10A through 10E are graphs of signals of the sensing system of FIG. 7 according to exemplary embodiments; and FIG. 11 is a schematic diagram of the sensing system of FIG. 7 according to an alternative embodiment.

DETAILED DESCRIPTION OF THE PREFERRED EXEMPLARY EMBODIMENTS

Figure 1:
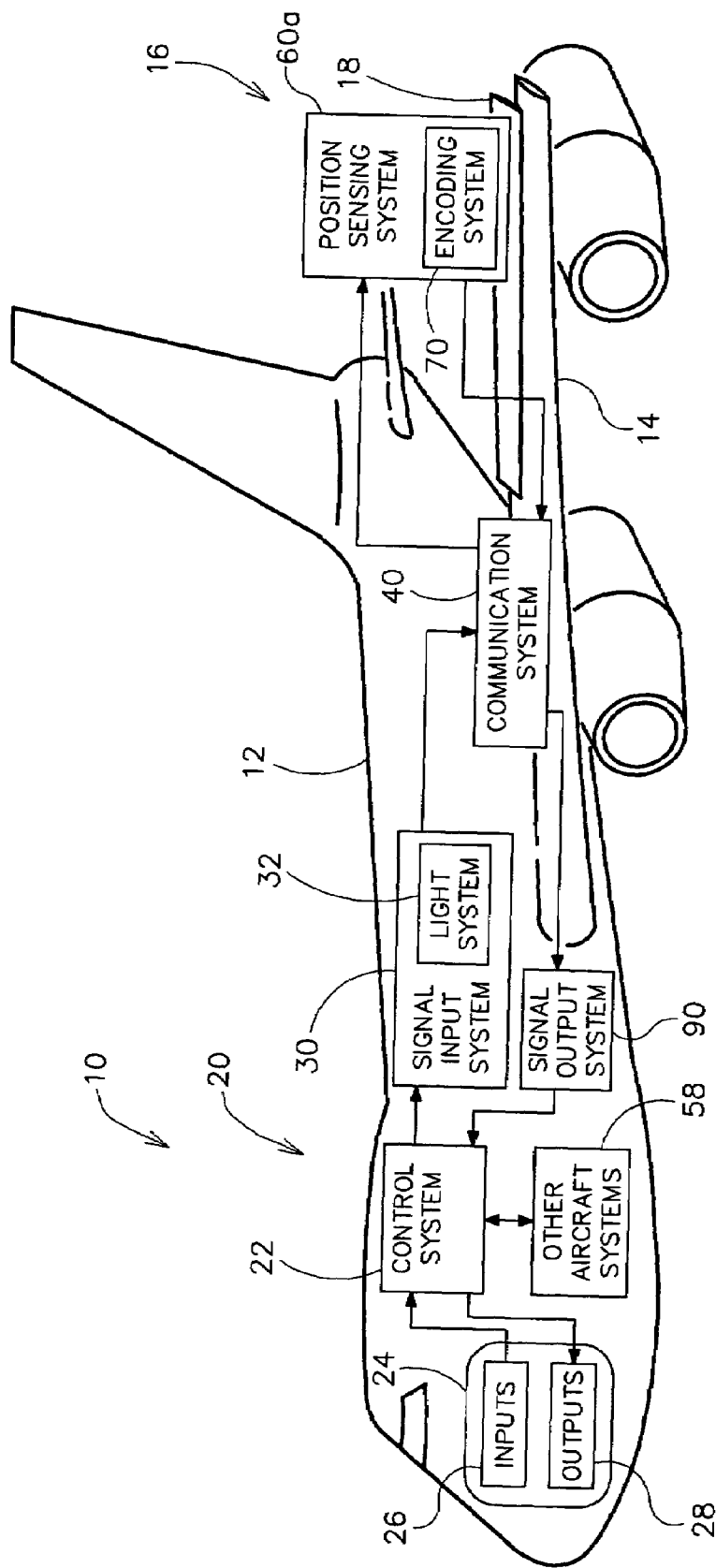
FIG. 1 is a schematic block diagram of a sensing system for determining a physical position of a flight control surface of an aircraft according to an exemplary embodiment.

Referring to FIG. 1, a sensing system 20 having a position sensing system 60a is shown according to an exemplary embodiment. The sensing system is useful for detecting the physical position of mechanical devices in high power and high electrical noise environments (e.g. industrial controls applications where large motors, induction furnaces, etc. may be present, control rods in nuclear reactors, the thickness of rollers in steel mills, etc.). As shown in FIG. 1, sensing system 60a is adapted to provide an encoded signal representative of a physical position of a flight control surface 16 of an aircraft 10 (shown as an aileron 18 of a wing 14).

Position sensing system 60a is located outboard or outside a main body or pressure envelope 12 of aircraft 10 as shown in FIG. 1 according to a preferred embodiment. An optical encoding system 70 of sensing system 20 is configured to encode the signal representative of the physical position of flight control surface 16 into a binary format for reading by a control system 22. This is generally accomplished by splitting an incident or illuminating beam or pulse of light into a series of time-delayed optically encoded pulses communicated in serial fashion on a single fiber according to a preferred embodiment.

Referring further to FIG. 1, control system 22 is shown located inboard or inside pressure envelope 12 according to a preferred embodiment. Input signals 26 are provided to control system 22 by other aircraft systems 58 (such as a control system of the aircraft) or are otherwise acquired by a user interface 24. Control system 22 runs programs, subprograms, routines and/or subroutines using input signals 26 to provide output signals 28. Output signals 28 are intended to control the position of flight control surface 16 according to a preferred embodiment.

Figure 2:
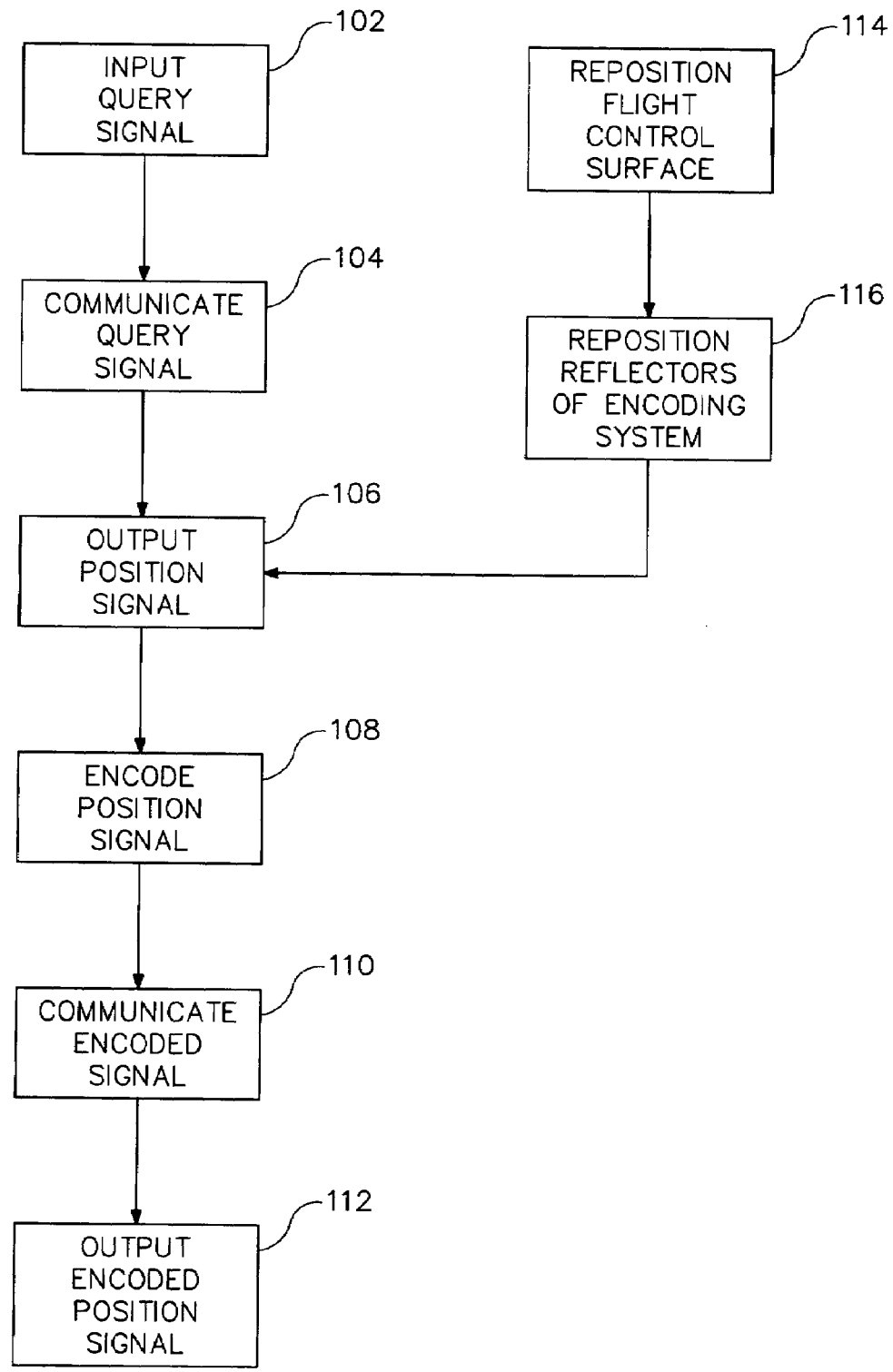
FIG. 2 is a flow diagram of a method for providing a signal representative of the physical position of the flight control surface using the sensing system of FIG. 1 according to an exemplary embodiment.

Referring further to FIG. 1 and to FIG. 2, sensing system 20 includes a signal input system 30. Signal input system 30 provides to position sensing system 60a a query or input signal (shown in FIG. 10A as an incident beam or pulse of light 54) from a lighting system 32 (step 102). Incident pulse of light 54 is communicated to position sensing system 60a via a communication system 40 (step 104). Incident pulse of light 54 is received by position sensing system 60a, which provides a reflected output signal (shown in FIG. 10B as a reflected beam or pulse of light 56) that is encoded into a binary format according to a preferred embodiment.

Communication system 40 provides at least two functions according to a preferred embodiment: (1) the separation or division of incident pulses of light into a plurality of incident pulses of light where the number of incident pulses of light corresponds to the precision of position sensing system; (2) the serial delay and/or retention of the incident pulses of light and the reflected pulses of light (e.g. each by successive periods of about 4 nanoseconds) which provides for serial separation of the bits of the encoded signal for reading by the control system.

Referring further to FIGS. 1 and 2, reflected pulses of light 56 are encoded into binary format by encoding system 70 (step 108). Reflected pulses of light 56 (e.g. a digitally encoded output position signal) are communicated to a signal output system 90 via signal communication system 40 (step 110). Signal output system 90 then provides the encoded position signal to control system 22. Control system 22 reads the encoded position signal, runs routines on the encoded position signal, and provides output signals 28 intended to control the physical position of flight control surface 16 (step 112) according to a preferred embodiment. According to an alternative embodiment, the control system may provide an output signal (e.g. to a display) representative of the physical position of the flight control surface or some other related parameter.

Figure 3:
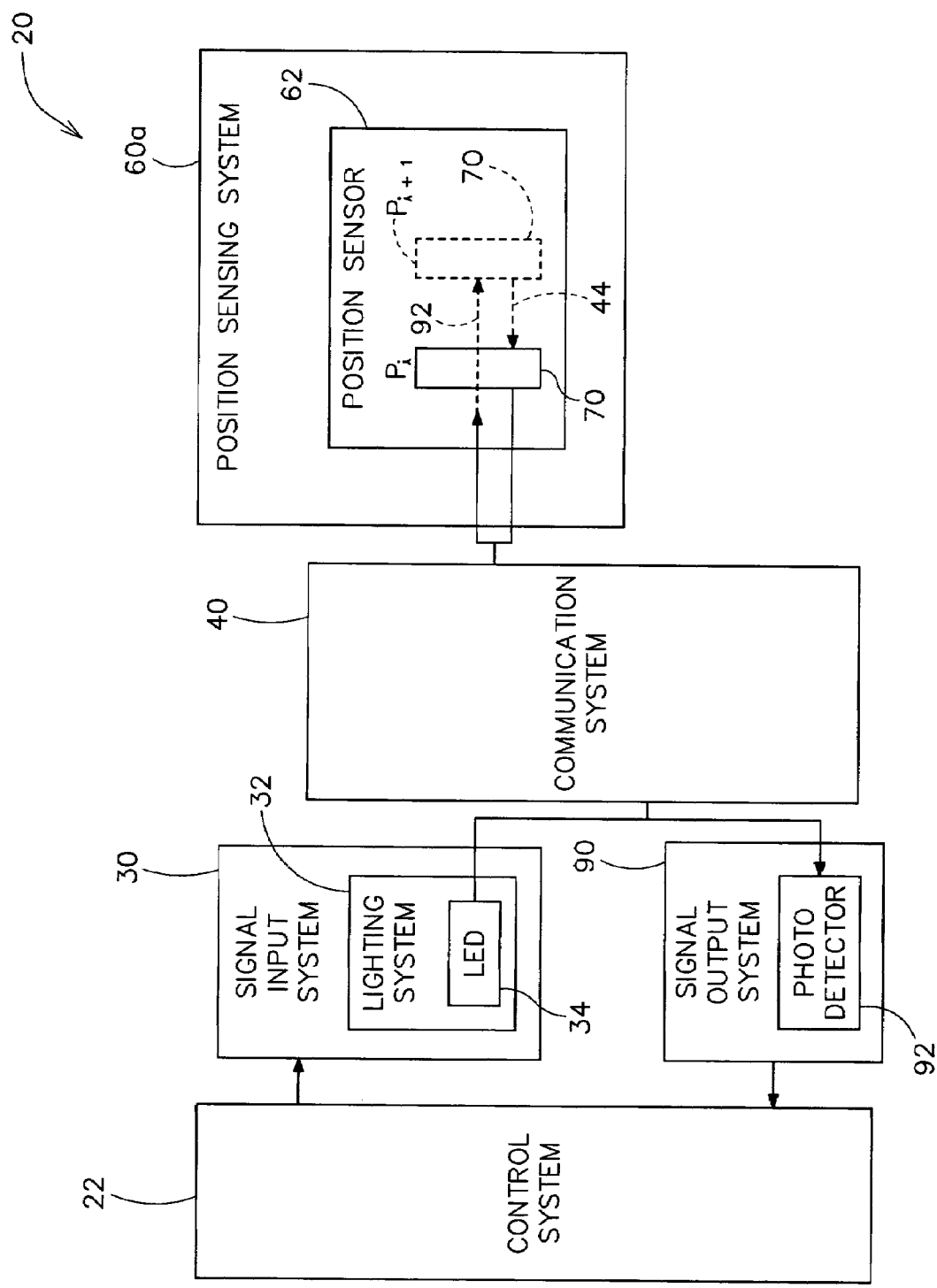
FIG. 3 is a block diagram of the sensing system of FIG. 1 according to an alternative embodiment.

Referring to FIG. 3, sensing system 20 is shown according to an alternative embodiment. Lighting system 32 of signal input system 30 is shown as a light emitting diode (LED) 34. The lighting system may include any light source that provides an incident beam or pulse of light such as a semiconductor laser diode according to alternative embodiments.

Referring further to FIG. 3, LED 34 provides the incident pulse of light which travels in an optical path through communication system 40 in an input direction to position sensing system 60a. The incident pulse of light is sent back by optical encoding system 70 (having a series of reflectors 76 and absorbers 78) of a position sensor 62. The resulting reflected pulses of light travel through communication system 40 in an output direction to a photodetector 92 of signal output system 90.

Referring further to FIG. 3, the reflected pulses of light are detected by photodetector 92 of signal output system 90. Photodetector 92 then provides to control system 22 a signal representative of the position of encoding system 70 and/or of the position of the reflectors and the absorbers (and of the position of flight control surface 16). According to a preferred embodiment, the position sensing system is "passive" (i.e. does not require external electrical power) since it uses optical inputs and outputs (i.e. light transmission through very fine, flexible glass or plastic fibers). According to a preferred embodiment, the optical paths comprise elongate fiber optic cables made of a non-conductor such as glass or plastic.

Figure 4:
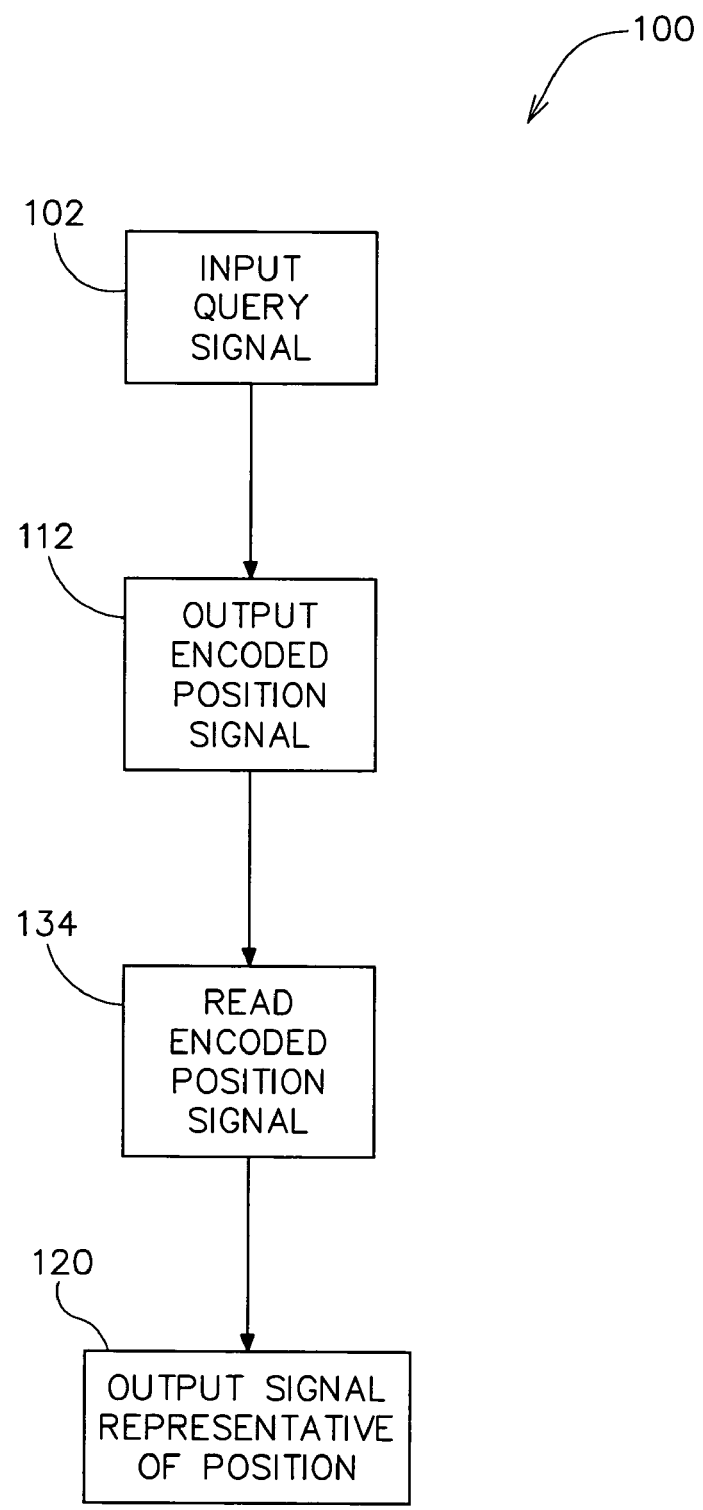
FIG. 4 is a flow diagram of a process of the sensing system of FIG. 1 according to an exemplary embodiment.

Referring to FIG. 4, a process 100 for determining the physical position of the flight control surface (based on the position of the reflectors and absorbers of the encoding system) is shown according to an exemplary embodiment. As shown in FIG. 4, the signal input or incident pulse of light is provided to the position sensing system (i.e. the position and/or configuration of the reflectors and the absorbers of the encoding system is queried) (step 102). The incident pulse of light is turned back by the encoding system (i.e. an encoded output position signal) (step 112).

The encoding system is in a first predetermined position $p_i$ or in a second predetermined position $p_{i+1}$ depending on the position of the flight control surface (see steps 114 and 116 shown in FIG. 2) according to an exemplary embodiment. For example, when the flight control surface is in a first position (e.g. aileron positioned at an angle of about 5.000 degrees) then the encoding system is in first predetermined position $p_i$—and when the flight control surface is in a second position (e.g. aileron positioned at an angle of about 5.005 degrees) the encoding system is in second predetermined position $p_{i+1}$.

The reflected pulses of light comprise an encoded output position signal (see step 112). The encoded position signal comprises a "word" or binary number having bits corresponding to the number of "tracks" or data values of the encoding system (see e.g. FIG. 5). For example, the encoding system shown in FIG. 5 has two tracks which yield an encoded position signal having two bits (e.g. (track 1 value, track 2 value)).

The nature of the encoded position signal is then read by the control system (step 134). In general, if the control system identifies that the two-bit encoded position signal corresponds to a predetermined binary value (or "word"), then the control system makes a determination that the flight control surface is in a predetermined position. The control system may include a lookup table (e.g. that resides in memory or associated hardware) or a mathematical equation for correlating the binary value to a physical position of the flight control surface. The control system then provides an appropriate output signal (step 134).

Figure 5:
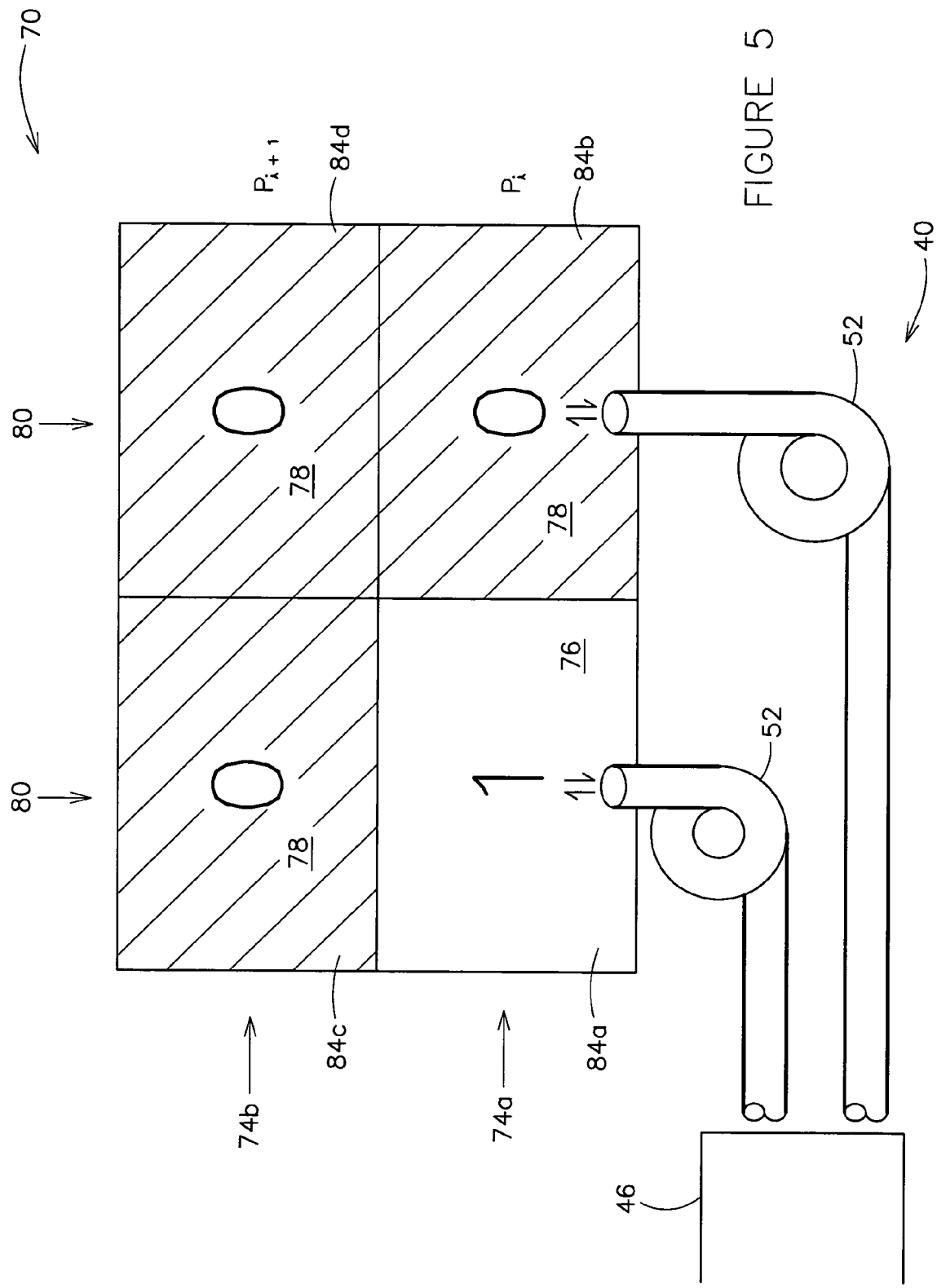
FIG. 5 is schematic diagram of an encoding system of the sensing system of FIG. 1 according to an exemplary embodiment.

Referring to FIG. 5, encoding system 70 of position sensing system 60*a* is shown according to an exemplary embodiment. Encoding system 70 includes columns shown as a track 80*a* and a track 80*b*. The number of tracks corresponds to the number of data bits of the encoded position signal. Each of track 80*a* and track 80*b* include a row shown as a row 74*a* and a row 74*b*. Each of the rows corresponds to a position of the flight control surface (e.g. $p_i$, $p_{i+1}$, etc.). Each of the columns intersects a row at a quadrant shown as a cell 84*a* through cell 84*d*. Each of cells 84*a* through 84*d* are configured to transmit or reflect the incident pulses of light from communication system 40 (see reflector 76 in cell 84*a*) or are configured to absorb the incident pulses of light (see pass-through or absorber 78 in cells 84*b*, 84*c* and 84*d*).

The rows of reflectors and absorbers of the encoding system are repositioned or reconfigured (e.g. by mechanical actuation of a lever, shaft, etc.) according to the physical repositioning of the flight control surface according to a preferred embodiment (see steps 114 and 116 shown in FIG. 2). Referring further to FIG. 5, when the flight control surface is in the first physical position, the incident beams of light are reflected and/or absorbed by row 74*a* representative of position $p_i$. When encoding system 70 is in position $p_i$, cell 84*a* reflects the incident pulse of light and cell 84*b* absorbs the incident pulse of light—thus, a return binary value of (1,0) is encoded (i.e. value of track "a" of row "a", value of track "b" of row "a"). When the flight control surface is in the second physical position, the incident beams of light are reflected and/or absorbed by row 74*b* representative of position $p_{i+1}$. When encoding system 70 is in position $p_{i+1}$, cell 84*c* and cell 84*d* both absorb the incident pulses of light—thus, a return binary value of (0,0) is encoded. The encoded outputs of the input query are "closed" (i.e. every query returns a result) according to a preferred embodiment.

Figure 6:
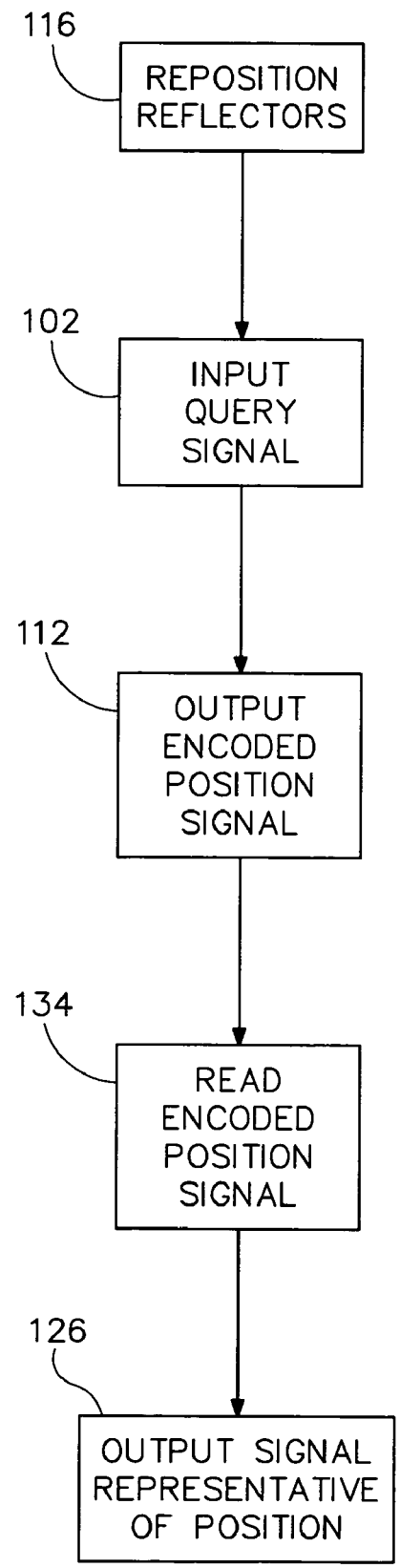
FIG. 6 is a flow diagram of a process of the sensing system of FIG. 1 according to an alternative embodiment.

Referring further to FIG. 5 and to FIG. 6, rows 74*a* and 74*b* of reflectors 76 and absorbers 78 are positioned (or reconfigured) among position $p_i$ and position $p_{i+1}$ according to the physical position (or repositioning) of the flight control surface (step 116). The incident pulse of light is provided through communication system 40 (i.e. input query signal) (step 102) and divided into a series of pulses. The incident pulses of light are sent back by reflectors 76 and absorbers 78 and return through communication system 40 (i.e. encoded output position signal) (step 106). The reflected pulses of light are encoded into binary format by encoding system 70 (see FIG. 5). The encoded position signal is read by the control system, which provides an output signal representative of the position of the flight control surface (step 126).

Figure 7:
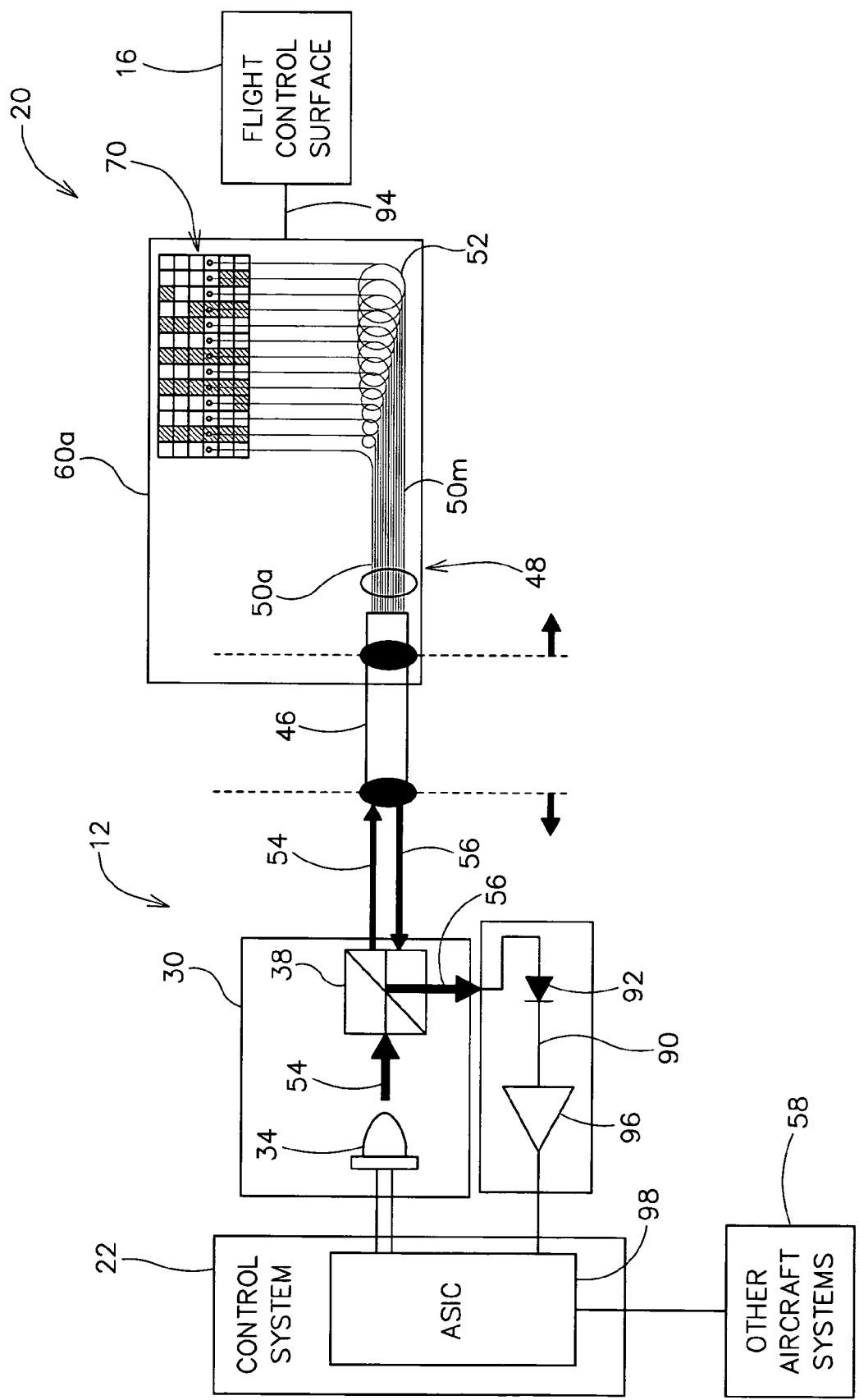
FIG. 7 is a block diagram of the sensing system of FIG. 1 according to an alternative embodiment.

Referring to FIG. 7, sensing system 20 is shown according to an alternative embodiment. An application specific integrated circuit (ASIC) 98 of control system 22 is shown coupled to the lighting system shown as LED 34 according to a preferred embodiment. (According to an alternative embodiment, the ASIC may be separate and/or external from the control system.) Incident pulse of light 54 transmitted from LED 34 passes through a splitter 38. From splitter 38, incident pulse of light 54 passes through a primary communication optical path shown as a single fiber 46. A secondary optical path shown as a fiber bundle 48 comprising individual fibers 50*a* through 50*m* abut against a terminal end of single fiber 46 in position sensing system 60*a*.

According to a particularly preferred embodiment, the single fiber may be relatively long having a length greater than about 10 km, preferably less than 1 km for non-aircraft applications, and a length of less than about 100 m for aircraft applications. Each of the individual fibers has a diameter less than the diameter of the single fiber according to a preferred embodiment. According to a particularly preferred embodiment, each of the individual fibers has a diameter of about 1/16 the diameter of the single fiber. According to an alternative embodiment, the diameter of the single fiber may be substantially the same as the diameters of the individual fibers of the bundle (e.g. coupled by an optical expanding device, optical spreader, star coupler, etc. to provide division of the incident pulse of light).

Each of individual fibers 50*a* through 50*m* have a delay section or loop 52 for delaying the time it takes the pulses of light to travel between position sensing system 60*a* and control system 22 according to a preferred embodiment as shown in FIG. 7. In general, a single light pulse (e.g. incident pulse of light 54) is directed out of single fiber 46 and is divided by fiber bundle 48. The incident pulse of light is effectively divided into a series of time-separated pulses by the delay loops.

The time-separated pulses are then sent back by the reflectors of position sensing system 60*a* (shown in FIG. 7 attached to flight control surface 16 by a mechanical linkage 94, such as a rod or shaft, according to an exemplary embodiment). The reflected pulses of light are then detected by photodetector 92. That signal (i.e. from the reflected pulses of light) is amplified by an amplifier 96 and subsequently provided to ASIC 98.

Figure 8:
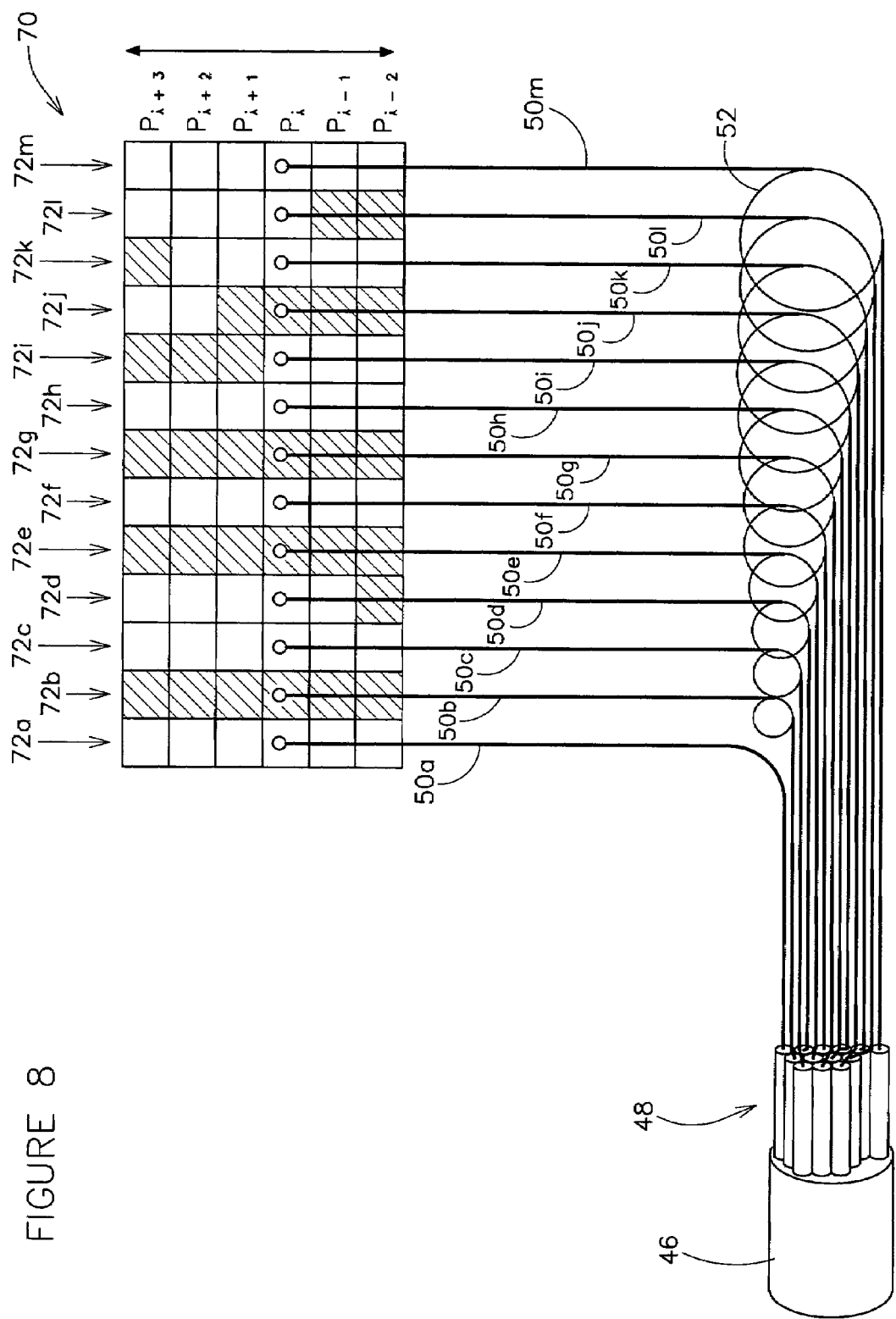
FIG. 8 is a schematic diagram of the encoding system of the sensing system of FIG. 7.

Referring to FIG. 8, encoding system 70 is shown according to an alternative embodiment. As shown in FIG. 8, individual fiber 50*a* has no delay loop according to a preferred embodiment. The time it takes for incident pulse of light 54 to travel from LED 34, through single fiber 46, through individual fiber 50*a* and to return to photodetector 92 is somewhat undefined due to the undefined length of single fiber 46. However, once that time is determined (e.g. by detection of the reflected light from fiber 50*a*) the time it takes for incident pulse of light 54 to travel and return through individual fibers 50*b* through 50*m* is predictable.

Figure 9:
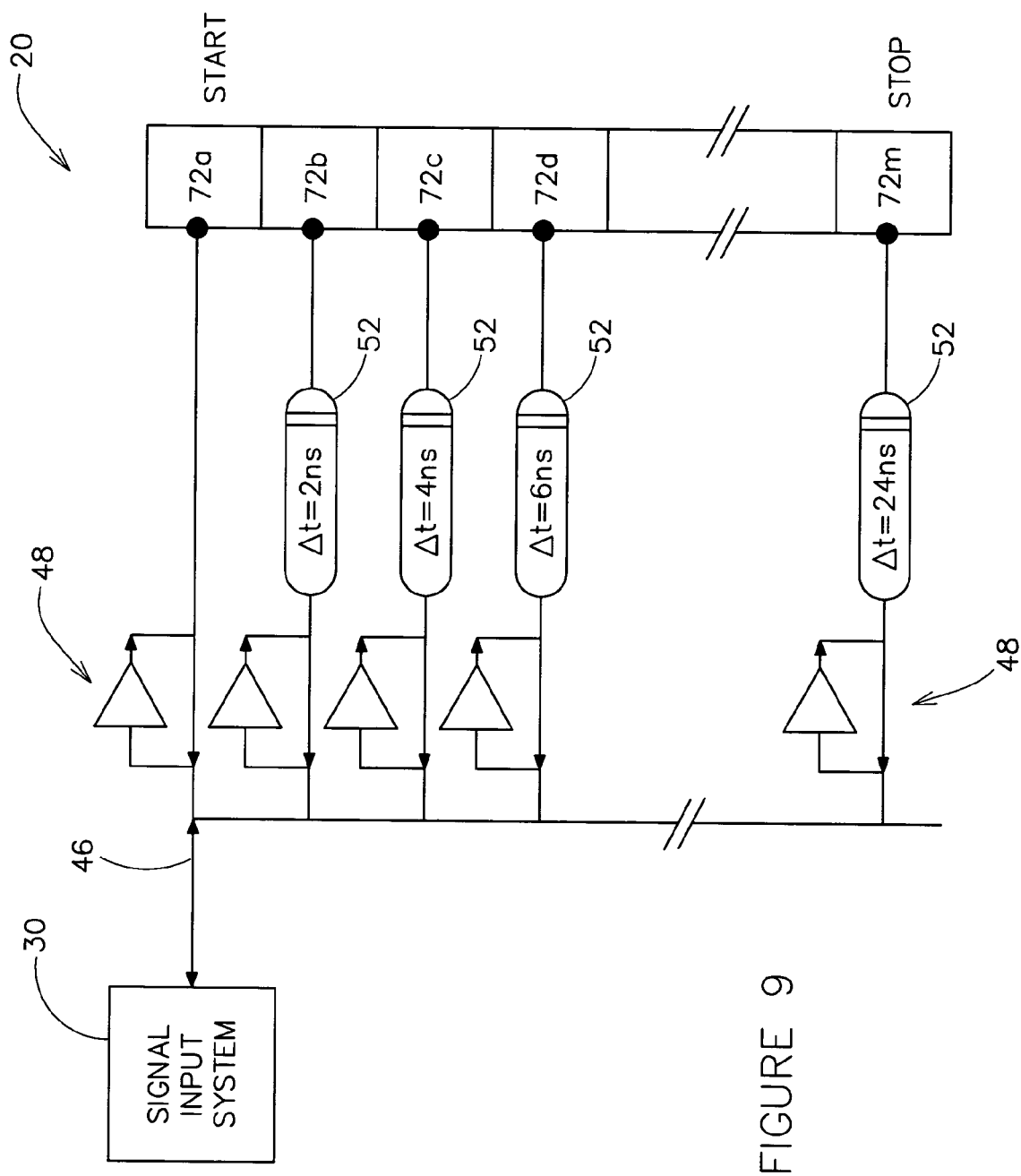
FIG. 9 is a schematic diagram of the sensing system of FIG. 7.

According to a preferred embodiment as shown in FIG. 8, the time it takes for incident pulse of light 54 to travel from LED 34 to reflector 78 is increased by about 2 nanoseconds for each of individual fibers 50*b* through 50*m*, respectively (due to the length of delay loop 52). Likewise, the time it takes for reflected pulses of light 56 to return from the reflector 78 to the photodetector is increased by about 2 nanoseconds for each successive individual fiber 50*b* through 50*m*, respectively (due to the length of delay loop 52). Thus, once the signal from individual fiber 50*a* is received by the control system, it is expected that the reflected output signal from each of individual fibers 50*b* through 50*m* will be received about 4 nanoseconds later than its predecessor. The total time to encode "n" bits is $((n-1) \times 4$ nanoseconds), where "n" is the number of delaying fibers, according to a particularly preferred embodiment. See also FIG. 9 showing sequential 4 nanosecond periods of delay in receipt of the reflected beams of light from each of the individual fibers.

Referring further to FIG. 8, individual fiber 50*b* associated with track 72*b* has a length that is longer than individual fiber 50*a* associated with track 72*a* (e.g. due to the greater length of delay loop 52 of individual fiber 50*b*) according to a preferred embodiment. Thus, the reflected pulses of light from track 72*b* will reach the photodetector after the reflected pulse of light from track 72. According to a preferred embodiment, the photodetector receives the reflected pulses of light from each of tracks 72*b* through 72*m* after it receives the reflected pulse of light from the immediate predecessor. (See FIG. 9.)

Referring further to FIG. 8, tracks 72*a* through 72*m* of encoding system 70 are each in communication with individual fibers 50*a* through 50*m*, respectively. The first track (e.g. track 72*a*) corresponds to a marker or "start" bit to indicate the beginning of the word comprising the following bits (e.g. the encoding bits of tracks 72*b* through 72*e*). The final track (e.g. track 72*m*) corresponds to another marker or "stop" bit to indicate the end of the word. Thus, 13 tracks (including 1 start track and 1 end track) correspond to $2^{11}$ or 2048 predetermined physical positions of the flight control surface. According to alternative embodiments, the number of tracks (and/or bits) can be increased to increase the precision of the sensing system.

According to a preferred embodiment, the control system associates the reflected pulses of light received during time sequenced periods as coming from the encoded tracks (e.g. the reflected pulse of light from track 72*a* is received by the photodetector before the reflected pulse of light from tracks 72*b* through 72*m*, each which have a delay loop having a length greater than its predecessor, respectively). See also FIG. 9 showing no additional delay of the reflected pulse of light sequentially associated with track 72*a*, and correspondingly larger periods of delay with each of tracks 72*b* through 72*m*, so that the reflected pulses of light are received in series by the control system due to the increasing lengths of the delay loops.

The lengths of the fibers may be optimized to reduce signal degradation according to any preferred or alternative embodiments. According to a particularly preferred embodiment, each of the individual fibers of the fiber bundle has a different length. The lengths of the individual fibers increase sequentially by about 0.42 meters to account for a light propagation delay of about 2 nanoseconds according to a particularly preferred embodiment—and the difference in length between the longest fiber of the fiber bundle and the shortest fiber of the fiber bundles is about 5.04 m according to a particularly preferred embodiment.

As shown in FIGS. 7 and 8, each of the illumination pulses cause a complete sample and read of the encoded position of the sensor. The sensor tracks may be encoded using a "gray code," whereby only a single bit changes from one position to the next according to a preferred embodiment. With this coding method, position boundary ambiguities may be resolved to output a valid +/−½ "LSB" or least significant bit position.

Referring to FIGS. 10A through 10E, graphs of input and output signals of sensing system 20 are shown according to exemplary embodiments. As shown in FIG. 10A, the light source (e.g. LED 34 shown in FIG. 7) transmits incident pulse of light 54 (see step 102 in FIG. 2). The incident pulse of light is reflected (see step 106 in FIG. 2). The reflected pulse of light is encoded into a binary value (see step 108 in FIG. 2). These binary values are shown in FIG. 10B as a positive value representative of the reflected light (and encoded as a value of "1") and a null value representative of the absorbed light (and encoded as a value of "0") according to a preferred embodiment.

The output signal provided by photodetector 92 is amplified by amplifier 96 (see FIG. 7) as shown in FIG. 10C. The amplified output signal is sampled at a high rate (e.g. less than about 2 nanoseconds—corresponding to a pulse of about 2 nanoseconds for the reflected pulses of the tracks) as shown in FIG. 10D according to a particularly preferred embodiment. Thus, the reflected pulses of light are delayed by about 4 nanoseconds for each track (due to the length of the delay loop) according to a particularly preferred embodiment (see FIG. 9). According to alternative embodiments, the output signal may be sampled at a slower rate.

As shown in FIG. 10E, the signals sampled in FIG. 10D are encoded as a series of data bits for each of the tracks (shown as a value of (1,0,1,1,0,1,0,1,1,0,1,1,1)) corresponding to tracks 72*a* through track 72*m* where track 72*a* provides the "start" bit and track 72*m* provides the "end" bit of the "word"). This encoded value is representative of a predetermined position of the flight control surface.

Referring to FIG. 11, sensing system 20 is shown according to an alternative embodiment. As shown in FIG. 11, sensing system 20 may comprise multiple position sensing systems shown as position sensing systems 60*b*, 60*c* and 60*d* each similar to position sensing system 60*a*. Thus, single fiber 46 with the single incident pulse of light may be used by each of position sensing systems 60*a* through 60*d*, each of which may be associated with a different (or the same) flight control surface according to alternative embodiments. The reflected pulses of light from position sensing system 60*a* arrive at the photodetector at a predetermined time (e.g. about 2 to 24 nanoseconds as shown in FIG. 9) according to a preferred embodiment. The reflected pulses of light from each of position sensing systems 60*b* through 60*d* are delayed for longer periods (e.g. about 50 nanoseconds, about 100 nanoseconds, about 150 nanoseconds, respectively) due to the length of delay loop 52 according to a preferred embodiment as shown in FIG. 11.

The incident and reflected pulses of light may be transmitted by any optical path according to alternative embodiments. The pulses of light may be delayed by other devices intended to time-separate the pulses of light (e.g. Doppler shift). According to an alternative embodiment, the delay loop may comprise an optical delay structure similar to the type employed in a ring laser gyro of the type of analog or ring laser gyros model nos. GG1320AN and GG1320AN commercially available from Honeywell International Inc. of Morristown, N.J.

The control system (see e.g. control system 22 shown in FIG. 1) of the sensing system may comprise a computing device, microprocessor, controller or programmable logic controller (PLC) for implementing a control program, and which provides output signals based on input signals provided by a user interface, sensor or that are otherwise acquired. Any suitable computing device of any type may be included in the information display system according to alternative embodiments. For example, computing devices of a type that may comprise a microprocessor, microcomputer or programmable digital processor, with associated software, operating systems and/or any other associated programs to implement the control program may be employed. The controller and its associated control program may be implemented in hardware, software or a combination thereof, or in a central program implemented in any of a variety of forms according to alternative embodiments.

It is understood that while the detailed descriptions, specific examples, material types, thicknesses, dimensions, and shapes discussed provide preferred exemplary embodiments of the present invention, the preferred exemplary embodiments are for the purpose of illustration only. For example, the sensing system may be used to identify the position of any device (including but not limited to a flight control surface) and is not limited to use in association with aircraft and other vehicles. The method and the system of the present invention are not limited to the precise details and conditions disclosed. Various changes will be made to the details disclosed without departing from the scope of the invention, which is defined by the following claims.

What is claimed is:

1. A passive sensing system for determining a physical position of a mechanical device, comprising:
   an encoding system configured to convert a position signal representative of the physical position of the mechanical device into an encoded signal in a binary format;
   a plurality of secondary optical paths coupled to a primary optical path, each of the primary optical path and the secondary optical paths positioned between a light source and the encoding system;
   wherein the encoded signal comprises a plurality of pulses of light each sequentially delayed by the secondary optical paths.

2. The system of claim 1 wherein the primary optical path comprises a single fiber optic cable and the plurality of secondary optical paths comprise a plurality of fiber optic cables.

3. The system of claim 2 wherein the encoding system is configured to convert the pulses of light into a representation of a binary number.

4. The system of claim 3 wherein the encoding system comprises a plurality of reflectors.

5. The system of claim 4 further comprising a control system configured for reading the encoded signal.

6. The system of claim 5 wherein the control system comprises an application specific integrated circuit.

7. The system of claim 5 wherein the control system further comprises a photodetector.

8. The system of claim 7 wherein the light source comprises at least one of a light emitting diode and a laser diode.

9. The system of claim 8 wherein the light source is configured to provide to the encoding system an input signal through the plurality of fiber optic cables.

10. The system of claim 9 wherein the encoding system is configured to provide to the control system the encoded signal through the plurality of fiber optic cables.

11. The system of claim 10 wherein the input signal is provided through the plurality of fiber optic cables in a first direction and the encoded signal is provided through the plurality of fiber optic cables in a second direction.

12. The system of claim 11 wherein the first direction is in a direction opposite of the second direction.

13. The system of claim 4 wherein the plurality of fiber optic cables engage the single fiber optic cable having a diameter greater than a diameter of each of the plurality of fiber optic cables.

14. The system of claim 13 wherein the plurality of fiber optic cables abut against the single fiber optic cable at an interface.

15. The system of claim 13 wherein the single fiber optic cable has a length of less than about 100 meters.

16. The system of claim 13 wherein a majority of the plurality of fiber optic cables each have a different length.

17. The system of claim 13 wherein the length of each of the plurality of fiber optic cables corresponds to a retention of the pulses of light in each of the plurality of fiber optic cables.

18. The system of claim 14 wherein the encoded signal is sampled at a rate of less than about 2 nanoseconds.

19. A system for determining a physical position of a fight control surface of an aircraft, comprising:
   means for transmitting an incident pulse of light;
   means for dividing the incident pulse of light into a plurality of incident pulses of light;
   means for reflecting the incident pulses of light and for providing a plurality of reflected pulses of light;
   means for delaying the incident pulses of light and for delaying the reflected pulses of light;
   means for detecting the reflected pulses of light;
   wherein a signal encoded in a binary format and representative of the physical position of the flight control surface is provided to the means for detecting the reflected pulses of light.

20. The system of claim 19 wherein the means for transmitting the incident pulse of light comprises at least one of a light emitting diode and a laser diode.

21. The system of claim 20 wherein the means for detecting the reflected pulses of light comprises a photodetector.

22. The system of claim 21 wherein the means for delaying the incident pulses of light comprises a plurality of fiber optic cables.

23. The system of claim 22 wherein the means for reflecting the incident pulses of light comprises a reflector.

24. The system of claim 23 wherein the reflector has a physical position corresponding to the physical position of the flight control surface.

25. The system of claim 24 wherein the means for dividing the incident pulse of light into the plurality of incident pulses of light comprises a plurality of fiber optic cables in communication with a single fiber optic cable.

26. A method for determining a physical position of a flight control surface of an aircraft, comprising:
   transmitting an incident pulse of light from a light source through a primary optical path and subsequently dividing the incident pulse of light into a plurality of incident pulses of light;
   transmitting the incident pulses of light through a plurality of secondary optical paths;
   reflecting the incident pulses of light with a reflector;
   transmitting the reflected pulses of light through the secondary optical paths and subsequently transmitting the reflected pulses of light through the primary optical path;
   detecting the reflected pulses of light with a control system having a photodetector;
   wherein an encoded signal representative of the physical position of the flight control surface is read by the control system.

27. The method of claim 26 wherein reflecting the incident pulses of light further comprises reflecting the incident pulses of light with a reflector having a physical position corresponding to the physical position of the flight control surface.

28. The method of claim 27 further comprising encoding the reflected pulses of light into a binary number corresponding to the physical position of the flight control surface.

29. The method of claim 28 further comprising delaying the incident pulses of light and the reflected pulses of light in a plurality of fiber optic cables.

30. The method of claim 29 wherein transmitting the incident pulses of light through the secondary optical paths comprises transmitting the incident pulses of light through the plurality of fiber optic cables each having a diameter less than a diameter of a single fiber optic cable of the primary optical path.

31. A passive sensing system for determining a physical position of a flight control surface of an aircraft, comprising:
- an encoding system configured to provide a signal encoded in a binary format and representative of the physical position of the flight control surface;
- a single fiber optic cable having a first diameter and coupled between a light source and the encoding system;
- a plurality of fiber optic cables each having a second diameter less than the first diameter and configured for coupling to an end of the single fiber optic cable;
- wherein an illumination pulse from the light source is divided into a plurality of pulses by the plurality of fiber optic cables.

32. The system of claim 31 wherein the illumination pulse comprises an incident pulse of light that is undivided in the single fiber optic cable and is divided in the plurality of fiber optic cables.

33. The system of claim 31 wherein the encoded signal comprises a plurality of pulses of light each delayed in the plurality of fiber optic cables.

34. The system of claim 33 wherein the plurality of pulses of light are delayed by a loop of the plurality of fiber optic cables.

35. The system of claim 33 wherein the plurality of pulses of light are serially delayed in the plurality of fiber optic cables.

36. The system of claim 35 wherein the plurality of pulses of light are delayed by less than about 4 nanoseconds.

37. The system of claim 35 wherein the plurality of fiber optic cables abut against the single fiber optic cable.

* * * * *